May 9, 1950 D. McKENNA 2,506,677
VEHICLE WHEEL
Filed Sept. 28, 1944 4 Sheets-Sheet 1

Inventor:
Denis McKenna,
by Thomson & Thomson
Attorneys

May 9, 1950          D. McKENNA          2,506,677
VEHICLE WHEEL
Filed Sept. 28, 1944          4 Sheets-Sheet 2

Inventor:
Denis McKenna,
by Thomson & Thomson
Attorneys

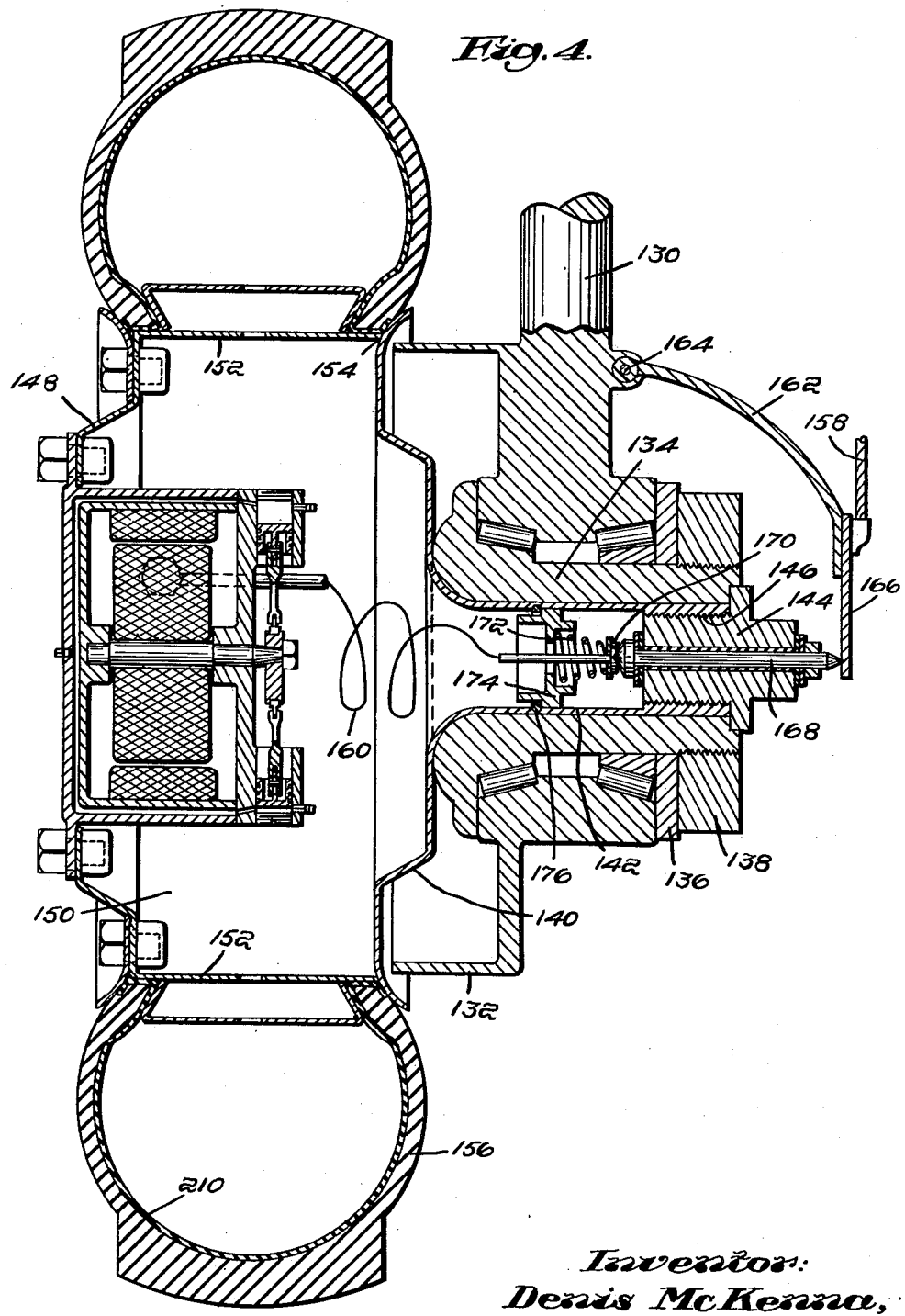

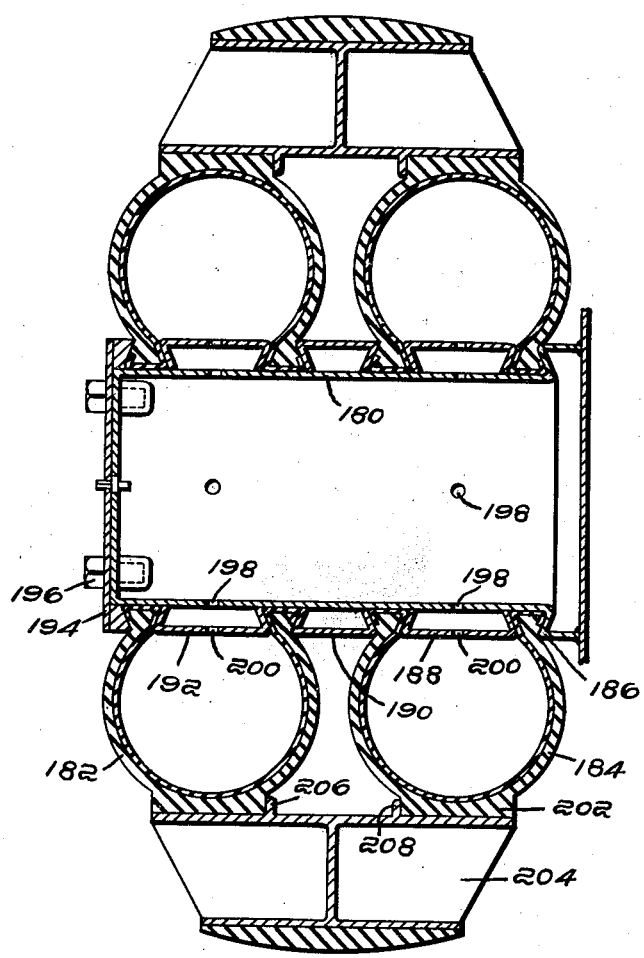

Patented May 9, 1950

2,506,677

UNITED STATES PATENT OFFICE 2,506,677

VEHICLE WHEEL

Denis McKenna, Weymouth, Mass.

Application September 28, 1944, Serial No. 556,225

1 Claim. (Cl. 152—422)

This invention relates to improvements in vehicle wheels and more particularly to improvements in pneumatic wheels for motor vehicles in which the body of the wheel has an air chamber in communication with the air chamber of the tire.

In common practice, vehicle wheels are provided with removable tires having inner tubes to confine the air chamber to the periphery of the wheel. It has, however, been proposed that the inner tubes be eliminated and the volume of the air chamber be enlarged by providing an air chamber in the wheel in communication with the tire casing. There are several advantages in such an arrangement. The increase in the air chamber makes for smoother riding and may permit reducing the size of the tire thus conserving rubber. The air is free to circulate in contact with metal walls which will dissipate the heat and the tires will run at lower temperatures and will wear longer.

It is an object of my invention to provide a double walled vehicle wheel providing an air chamber at the center of the wheel with means for mounting and sealing a tire casing on the wheel, the chamber of which is in communication with the air chamber of the wheel.

It is further an object of my invention to provide means by which the common air chamber of the tire and wheel may be pumped up to the desired pressure and the pressure maintained automatically while the vehicle is in motion.

More specifically it is an object of my invention to mount an electrically operated pump in the body of the wheel and to provide means operating the pump through relatively movable electrical contacts between the rotatable wheel and the vehicle chassis.

Further objects and advantages of my improvements will be more readily apparent from the following descriptions of preferred embodiments hereof as disclosed in the attached drawings, in which:

Fig. 4 is a vertical section showing a modified construction for an airplane wheel;

Fig. 5 is a vertical section showing a further modification for a truck wheel in which the tire casings are relatively small in diameter and serve to support a solid rim or tread which is in contact with the road surface; and, Fig. 6 is a fragmentary detail view showing the support and mounting of the electrical contact arm.

Figure 1:
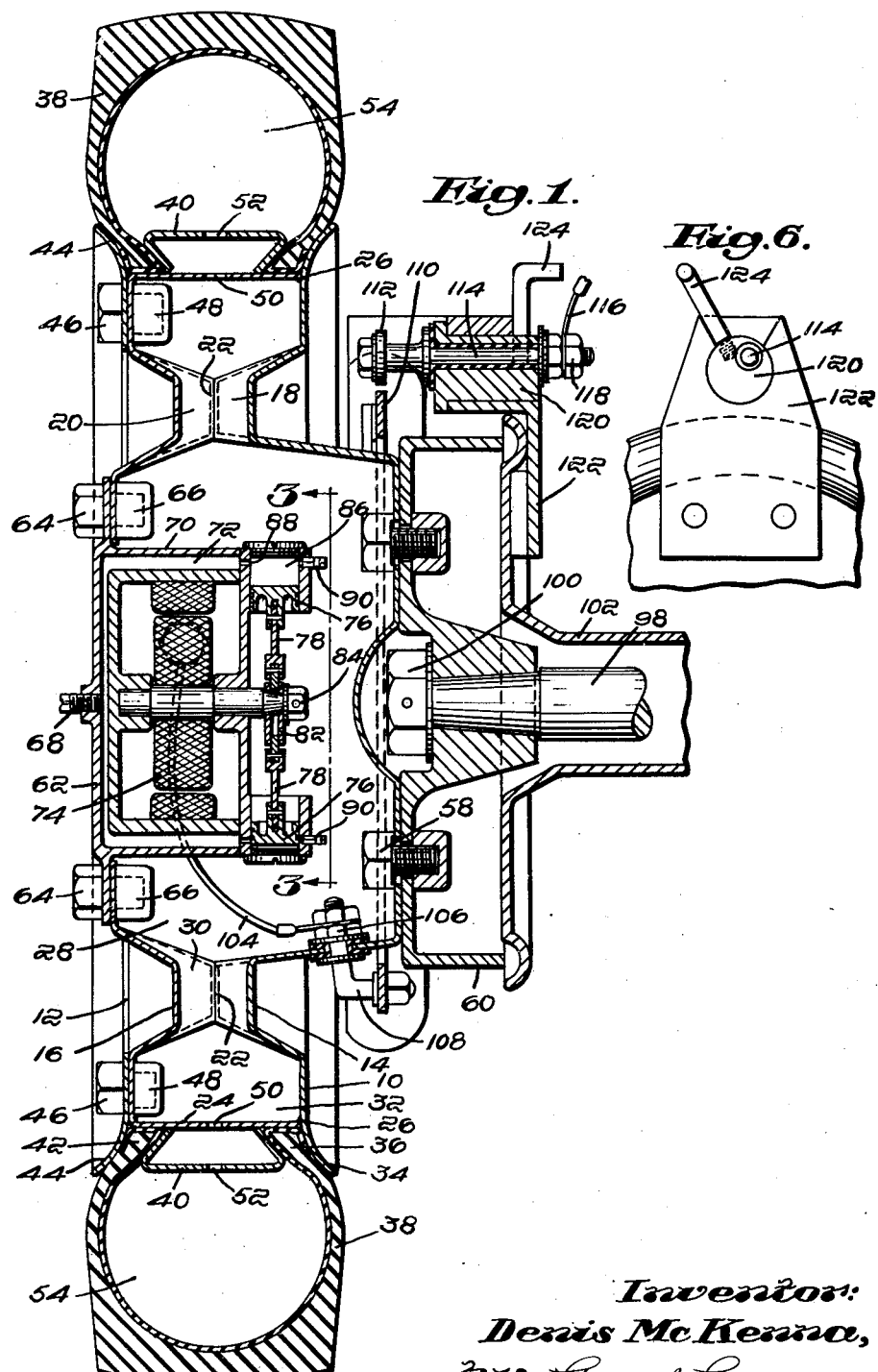
Fig. 1 is a vertical section taken through the axis of a wheel illustrating my improvements.
Figure 2:
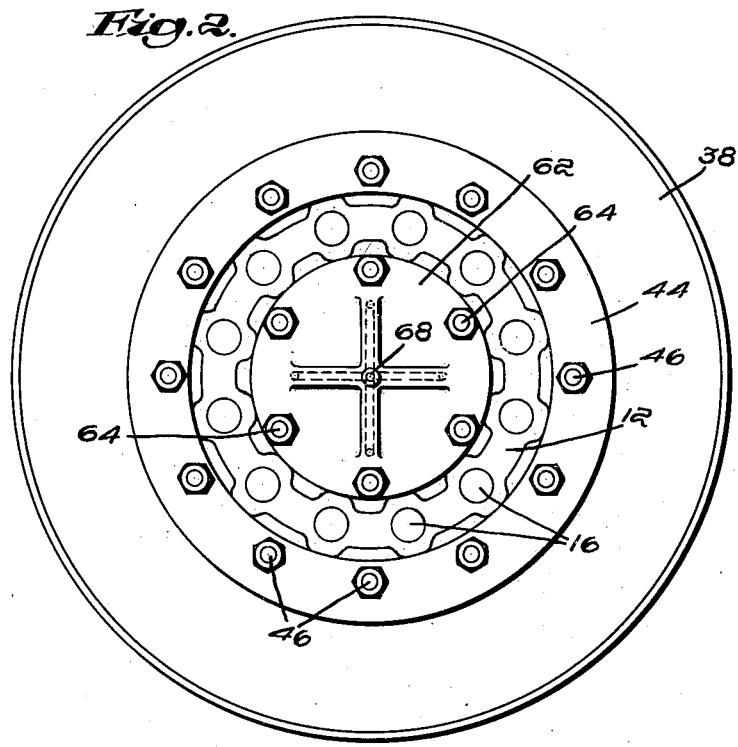
Fig. 2 is a front elevation of the wheel shown in Fig. 1.
Figure 3:
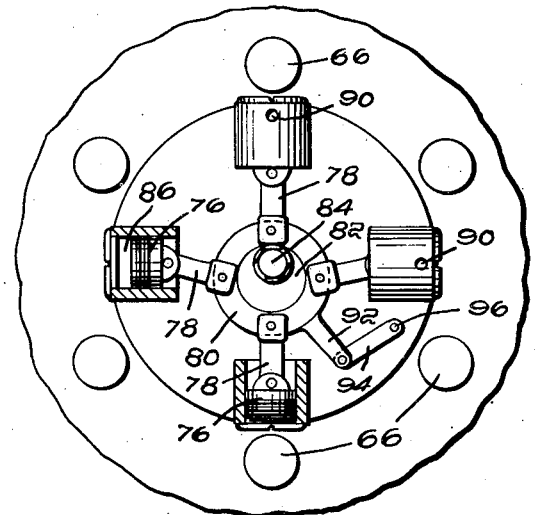
Fig. 3 is a detail section taken on the plane indicated 3—3 in Fig. 1 and showing the pump construction.

Referring to Fig. 1, there is shown a disc wheel composed of the pressed metal plates 10 and 12 each of which has an annular depression 14 and 16 respectively, spaced portions of which have deeper depressions 18 and 20, the meeting faces of which are welded together as indicated at 22. The outer plate 12 has a peripheral flange 24 which is welded at its marginal edge to the inner plate 10 as indicated at 26. The plates 10 and 12 are thus secured together to form a central chamber 28, radial passages 30 intermediate the welded portions 22 and an annular chamber 32.

The inner plate 10 is flanged as at 34 to form a stop or rim for the bead 36 of the tire casing 38. A ring shaped member 40 is positioned between the inner bead 36 and the outer bead 42 of the tire casing. The tire is held in place by the removable flanged ring 44 which is attached by bolts 46 threaded into studs 48 welded or otherwise secured to the plate 12.

The flange 24 of plate 12 is provided with openings 50 and the ring 40 has openings 52 to provide for free passage of the air between the chambers 28 and 32 of the wheel and the chamber 54 of the tire casing.

The wheel is mounted for ready removal to change or shift tires. As shown in Fig. 1, the inner plate 10 may be fixed by bolts 58 to the brake drum 60. Access is obtained to the bolts 58 for changing the wheel by first removing the casing 62 which forms the center of outer plate 12. The cover plate or casing 62 is secured by bolts 64 threaded into the sockets 66.

The air pressure may be built up by pumping in air through a valve positioned at some convenient place on the wheel to admit air into the air chambers of the wheel. As shown, a valve 68 is installed at the center of the hub or cover 62.

Although the wheel and tire could be pumped up in the usual manner by connecting an air hose to the valve 68, I prefer to employ automatic pumping means mounted within the wheel. Thus the hub 62 is formed with a cylindrical flange 70 extending into the chamber 28 and forming a compartment 72 to receive a motor 74 for operating suitable pumping mechanism such as the reciprocable pistons 76 moved by links 78 from the eccentric ring 80 engaged by the eccentric 82 on the motor shaft 84. The air is admitted to the pump chambers 86 through the inlet ports 88.

The air is compressed and delivered into the wheel chamber 28 through the valve controlled ports 90. The movement of the eccentric ring is limited by providing the arm 92 and link 94 pivotally fixed at 96.

The wheel is mounted on an axle in any suitable manner. In Fig. 1 I have shown the wheel bolted to the brake drum 60 which is mounted on the axle 98 and secured by nut 100. A fragmentary portion of the axle housing 102 is shown in Fig. 1. Since the wheel rotates with respect to the housing 102, special means must be provided to conduct electric current to the motor 74. The motor is grounded on one side to the frame. The other terminal has a lead in wire 104 fastened to connection 106 which is mounted on but insulated from the inner plate 10. The arm 108 of the connection 106 serves as a mounting for a ring member 110. Contact with the suitable ring 110 is made through a roller 112 which is carried by a shaft 114 to which the wire 116 is suitably connected at 118. The shaft 114 is insulated from an eccentric 120 carried by bracket 122 which is fixed to the axle housing 102. The eccentric 120 may be turned through a lever arm 124 to move the roller 112 into contact with the ring 110. Any other suitable means may be employed to transmit the electrical current to the motor 74.

Fig. 4 shows a modified design which may be used for an airplane wheel. The wheel support 130 is made integral with the brake drum 132 and forms a bearing for the short axle 134 which is secured to the support 130 by roller 136 and nut 138. The inner plate 140 of the wheel has a tubular portion 142 which is retained in the axle 134 by the stud 144 threaded at 146 to the tubular portion 142.

The outer plate 148 of the disc has a cylindrical flange 152 the edge of which is welded at 154 to the inner plate 140 to form a chamber 150 at the center of the wheel. The tire 156 is mounted in the same manner as in Fig. 1.

An automobile pump is shown in Fig. 4 similar to that in Fig. 1. The electrical current is conducted to the motor through the wires 158 and 160, a spring arm 162 is pivoted at 164 and carries a contact plate 166 to which the wire 158 is connected. The plate 166 resiliently bears against the point of the rotatable pin 168 which is mounted in but insulated from the stud 144. The wire 160 is connected to a contact member 170 which is pressed against the inner end of pin 168 by a spring 172. The spring 172 rests against a stop 174 which is held in place by a lock ring 176 seated in the tubular portion 142 of the inner plate 140.

Fig. 5 shows a modified design for a wide truck wheel in which the hub 180 is made to provide a central air chamber. A pair of small diameter tire casings 182 and 184 are mounted on the hub. The inner end of the hub is formed with an outwardly directed flange 186 to grip the bead of the casing 184. Spacing rings 188, 190 and 192 are provided. The rings 188 and 192 are arranged to fit within the tires between the beads while the ring 190 is placed between the tires to press against the outer surfaces of the tire beads. A removable ring or plate 194 is provided to engage the outer bead of the outer tire 182. The ring 194 is fixed in place by the bolts 196. Openings 198 and 200 are provided to permit free passage of the air from the central chamber into the tire casings.

The tires 182 and 184 have specially formed treads 202 to engage a rigid ground engaging rim 204. The flanges 206 and 208 hold the rim 204 against axial displacement with respect to the tires.

In every embodiment the hub portion of the wheel is made hollow to provide an air chamber which is in free communication with the resilient shock absorbing tire casings. Since no inner tubes are used, it may be desirable to use a sealing coating or a rubber lining in the tire casing as indicated at 210 although the provision of automatic pumping means operative while the vehicle is in motion will readily take care of slow leakage of the air. The central air chamber permits a larger volume in the combined chambers of the wheel and tire casing than if the air chamber is confined to the periphery of the rim adjacent the tire.

I claim:

A wheel comprising a pneumatic body and a pneumatic tire, said wheel body having an air chamber at the center of the wheel and extending across the axis of the wheel, said air chamber being in free communication with the interior of the tire, the outer wall of said wheel body having a removable central plate, air pumping means mounted on said plate within said air chamber at the axis of the wheel, said air pumping means being operable to build up the air pressure within said air chamber and within the pneumatic tire, and electrical means for operating the air pumping means while the wheel is in rotation.

DENIS McKENNA.

REFERENCES CITED

The following references are of record in the file of this patent:

UNITED STATES PATENTS

| Number | Name | Date |
|---|---|---|
| 1,049,678 | Craig | Jan. 7, 1913 |
| 1,470,742 | Ibach | Oct. 16, 1923 |
| 1,359,949 | Barger | Nov. 23, 1920 |
| 1,486,173 | Williams | Mar. 11, 1924 |
| 1,972,770 | Gillespie | Sept. 4, 1934 |
| 2,211,935 | Parker | Aug. 20, 1940 |